No. 836,327. PATENTED NOV. 20, 1906.
J. MACKIE.
MACHINERY FOR WINDING BALLS.
APPLICATION FILED NOV. 15, 1901.

No. 836,327. PATENTED NOV. 20, 1906.
J. MACKIE.
MACHINERY FOR WINDING BALLS.
APPLICATION FILED NOV. 15, 1901.

No. 836,327. PATENTED NOV. 20, 1906.
J. MACKIE.
MACHINERY FOR WINDING BALLS.
APPLICATION FILED NOV. 15, 1901.

No. 836,327. PATENTED NOV. 20, 1906.
J. MACKIE.
MACHINERY FOR WINDING BALLS.
APPLICATION FILED NOV. 15, 1901.

No. 836,327. PATENTED NOV. 20, 1906.
J. MACKIE.
MACHINERY FOR WINDING BALLS.
APPLICATION FILED NOV. 15, 1901.

WITNESSES.
Rob S. Allyn
H. M. Skinner.

INVENTOR.
John Mackie
by
John P. Bartlett
ATTORNEY.

UNITED STATES PATENT OFFICE.

JOHN MACKIE, OF NEILSTON, SCOTLAND, ASSIGNOR TO R. F. AND J. ALEXANDER AND COMPANY, LIMITED, OF NEILSTON, SCOTLAND.

MACHINERY FOR WINDING BALLS.

No. 836,327.     Specification of Letters Patent.     Patented Nov. 20, 1906.

Application filed November 15, 1901. Serial No. 82,440.

*To all whom it may concern:*

Be it known that I, JOHN MACKIE, engineer, of Neilston, Renfrewshire, Scotland, a subject of the King of Great Britain and Ireland, have invented certain new and useful Improvements in and Relating to Machinery for Winding Balls, of which the following is a specification.

This invention has reference to improvements in and relating to machinery for winding thread, yarn, twine, and the like into balls, and comprises appliances whereby all the working parts of the machine are made to work automatically, so that the ball shall be wound and formed with the ticket laced in and the finishing end of the thread inserted into the ball, and in order that others skilled in the art to which my invention relates may properly understand the same I have hereunto appended nine sheets of drawings, in which the same reference characters are used to denote like parts where repeated.

Fig. 1ª is a partial elevation of the other end of the machine. Fig. 7ª is an enlarged detail view of the clamping mechanism for the thread.

Referring to the drawings, according to my improvements I propose to use the ordinary flier $z$ generally in use on balling-machines, but to arrange its motion in such a way that after forming the first part of the ball it will stop automatically and be placed in a position clear of the ticketing mechanism which comes into operation and places the ticket on the ball. The flier then automatically begins lacing in the ticket. After the ball is completed the flier stops and is placed in a position clear of the cutting mechanism which then comes into operation. At this time the flier is caused to partially rotate, so as to place the thread in the clamping-hook, which holds it while it is being cut for the purpose of starting the next ball. The flier having completed one ball is now started automatically and goes through the same cycle of operations for each ball.

The holding of the end of the thread for the starting of the ball I accomplish by means of a clamp-hook 1, fixed to the end of a sliding-bar 2, clamping the thread against the end of the tubular guide 3, through which the bar 2 slides. Attached to the said clamp-hook 1 is a projecting part 4, which carries the thread some distance beyond the clamp, forming a loop into which a tubular knife 5 operates and cuts the thread. The movable knife 5 is actuated by a cam 55 and spring 7, the cam 55 being so arranged as to draw back the knife against the strain of the spring and release it at the proper time to spring forward and cut the thread.

I fix on the framework of the machine a counter-shaft 13, fitted with fast and loose pulleys and a belt-shifter, said shaft 13 being driven by means of a belt from the main shaft. This belt being inclosed in the fork of the belt-shifter can be shifted by hand onto the fast or loose pulley, starting or stopping the machine, as required, in the usual way. The flier-shaft 14 is driven by means of a belt 15 on pulley 15', which is fixed on shaft 14 from the aforesaid counter-shaft 13, and the fliers $z$ are driven from the flier-shaft 14 by means of the ordinary skew gear-wheels. The cam-shaft 8 is geared to the flier-shaft 14 by means of the following train of gears, as shown particularly in Figs. 1 and 4, and driven from the pulley 17, which is loosely mounted on the shaft 14. The wheel $a$ is attached to the shunt-pulley 17 and gears with the wheel $c$, mounted on the counter-shaft $e$, which also carries the pinion $d$. This pinion $d$ is in engagement with a wheel $f$, which with its companion spur-wheel $h$, to which it is bolted, is mounted loose on the sleeve $g'$. This sleeve $g'$ is cast in one piece with the bracket $g$. Spur-wheel $h$ gears with a spur-wheel $i$, attached to the counter-shaft $j$, carrying the wheel $k$, which controls a wheel $l$, mounted on the counter-shaft $m$ with the wheel $n$. The wheel $o$, mounted on the counter-shaft 67, is controlled by this wheel $n$. On this shaft 67 the chain-wheel $q$ is mounted, over which passes the chain 16 to control or drive the shaft 8 through the corresponding chain-wheel $r$. The ratio of these gears may be changed to obtain the required speed in the main cam-shaft 8.

Figure 13:
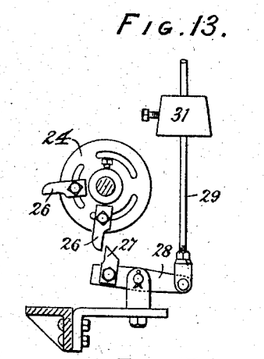
Figs. 13 and 14 are side elevations of the trip-cam mechanism for the shunt arrangement.

To accomplish the automatic working of the machine, I introduce a shunt arrangement to operate the driving-belt in such a way that by shifting the belt 15 from one pulley to another one part of the machine may be started and another part stopped, as may be arranged. To accomplish the necessary movements for ticketing, ending, and doffing the ball, I propose to shift the belt which drives the flier-shaft 14 onto a shunt-pulley 17, which runs loose on the flier-shaft, and which pulley is connected by gearing to operate the ticketing, ending, doffing, and belt-returning mechanism. The shifting of the belt from the tight pulley 15' across the idle transfer-pulley 17' and onto the shunt-pulley 17 I accomplish by means of a sliding bar 18, Fig. 4, with belt-shifter fork 19 attached, which I call the "shunt-bar," and which bar is carried in suitable bearings and operated by a spring 20, which I call the "shunt-spring." When the portion of the ball previous to the ticketing is being made, the shunt-bar 18 is held in position, with the belt on the driving-pulley 15', against the action of the shunt-spring by means of a pawl 21, attached to the end of a lever 22, which I call the "return-lever," said pawl engaging with a notch 23 in the shunt-bar 18. The time to shift the belt from the driving-pulley to the shunt-pulley is regulated by a trip-cam 24 on the shaft 25. The shaft 25, which carries a cam 24, is driven by a series of gears 251, 252, 253, 254, 255, 256, 257, 258, and 259, the last one of which is carried by the shaft 14. Said cam lifts the pawl 21 out of the notch 23 in the shunt-bar 18 by means of adjustable teeth 26 (see Fig. 13) on the trip-cam 24, acting on the projection 27 of an oscillating lever 28, and thus through the medium of a rod 29, attached to a pushing-link 30, frees the shunt-bar to the action of the shunt-spring which slides the shunt-bar, the shunt-bar carrying with it the belt from the driving-pulley to the shunt-pulley, the rod 29, with connections, being brought back to their normal positions, as shown in Fig. 13, by means of a weight 31, the supporting parts being so proportioned as to make this a position of rest. The pawl 21 is drawn downward by the spring 212.

Figure 14:
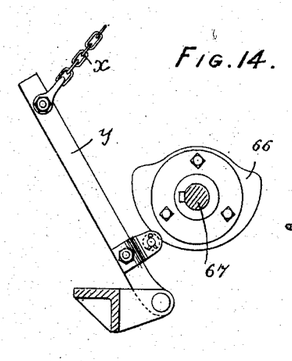
Figure 15:
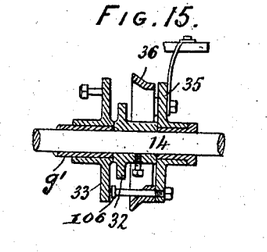
Fig. 15 is a sectional view of part of the shunt mechanism for stopping the flier.
Figure 16:
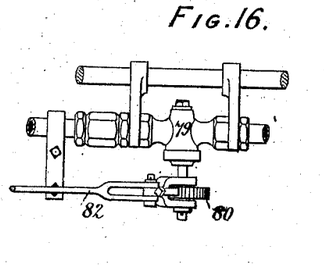
Fig. 16 is a plan view of vacuum admission-cocks.
Figure 22:
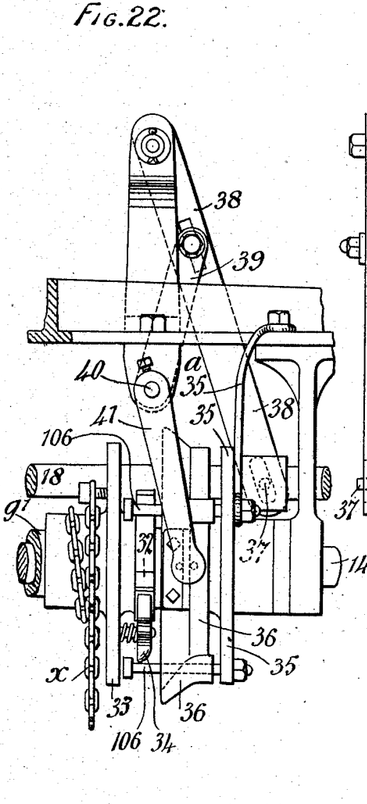
Figs. 22 and 23 are enlarged views of details of the clutch mechanism shown in Fig. 15.
Figure 23:
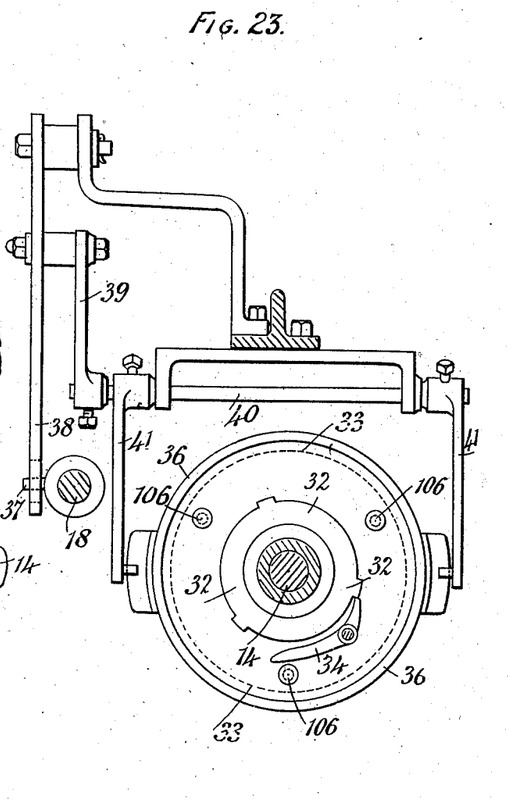

The shifting of the belt onto the shunt-pulley brings into operation the ticketing and belt-returning mechanisms and also a mechanism for stopping the flier $z$ in a certain position. The stopping of the flier in a certain position I accomplish in the following manner: On the flier-shaft 14 I fix a ratchet-wheel 32, (see Fig. 1,) and on a fixed sleeve $g'$, concentric with the flier-shaft, (see Fig. 15,) I place a disk 33, fitted with a pawl 34 to engage in the ratchet-wheel, and I also provide a fixed guard 35, carrying a hollow cone 36, (see Figs. 22 and 23,) which slides on the rods 106, that acting on the pawl prevents it gearing with the ratchet-wheel except at a certain part of the revolution. (See Fig. 15.) The shunt-pulley 17 controls the movement of the disk 33, carrying the pawl, by means of the gearing $a\ c\ d\ f\ h\ i\ k\ l\ n\ o$, to the shaft 67. The cam 66 on this shaft 67 controls the movement of the arm $y$ (see Figs. 14 and 19) and rotates the disk 33 in one direction by means of the chain $x$. Attached to the same disk 33 is a cord and weight 65 for rotating the disk in the other direction. When the belt is shifted onto the shunt-pulley, this gives motion to the disk-carrying the pawl, which engages with the ratchet-wheel and carries it round until the pawl is acted on by the hollow cone 36 of the fixed guard 35, taking the pawl out of action and leaving the flier in a fixed position and clear for the putting on of the ticket. The sliding of this cone 36 I accomplish by means of a pin 37 (see Fig. 4) on the shunt-bar 18, engaging in a slot in a long lever 38 and which by means of the connecting-lever 39, attached to the spindle 40, oscillates the levers 41 to give the said motion to the cone when the belt is shifted from pulley 17 to pulley 15'.

Figure 6:
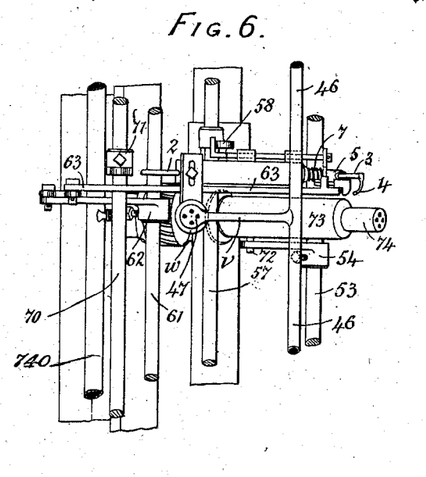
Fig. 6 is a plan view of same.
Figure 9:
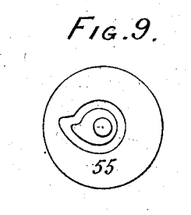
Figs. 9 to 12 are front views of cams and a doffing-plate.
Figure 10:
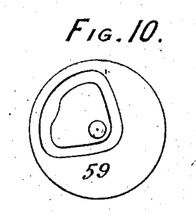
Figure 11:
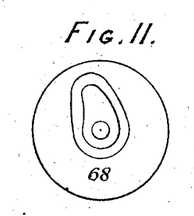
Figure 12:
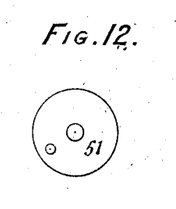
Figure 20:
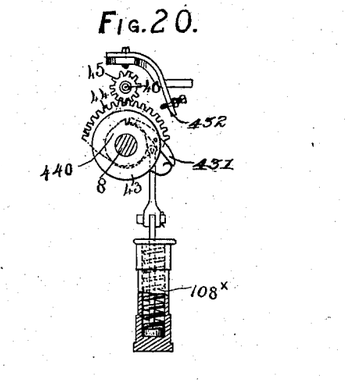
Figs. 20 and 21 are front and side elevations, respectively, showing the quadrant and pneumatic buffer to the ratchet and pawl for the ticketing-cups.
Figure 21:
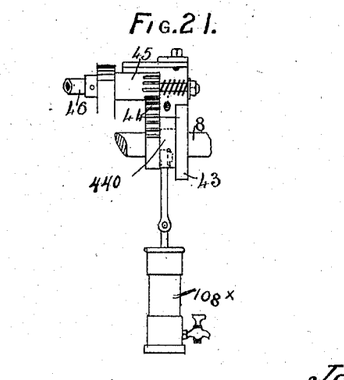

The operating of the ticketing mechanism I accomplish in the following manner: In line with the pivot $b$ (see Fig. 3) of the swinging frame 42 (see Fig. 1) of the machine is mounted the shaft 8, which is connected by gearing, as hereinbefore described, to the shunt-pulley 17. On this shaft 8 I fix a disk 43, (see Fig. 1 and enlarged Figs. 20 and 21,) which actuates a quadrant 44 by the pawl 431 and a single-toothed ratchet-wheel 440. The quadrant gears with a pinion 45 on the hollow rocking shaft 46 of the ticketer. (See Fig. 6.) When the belt is shifted onto the shunt-pulley 17, it gives motion to the quadrant 44, which, acting on the pinion 45 on the hollow rocking shaft 46, throws over the ticketing-cups 47, which carry the tickets. The shaft 8 continues to revolve and the pawl 431 is disengaged by the set-pin 432. A buffer-spring in the cylinder 108× brings the ticketing-cups 47 back to their normal position by means of the quadrant 44 and pinion 45. The piston within the cylinder 108× when forced down expels the air through the tap-opening to regulate the discharge of air. This constitutes a pneumatic buffer. The shunt-pulley 17 is also geared by means of the gears already described to shaft 67, and thence by means of bevel-gear $s'$ to the bevel-gear $t'$, mounted on the cross-shaft 48, (see Fig. 1,) on which is fixed a cam 49, (see Fig. 4,) which I call the "return-cam." This return-cam 49 operates the return-lever 22, a cam-roller carried by this lever being held against the cam by means of the spring 50, which I call the "overcoming-spring" and which is strong enough to overcome the power of the shunt-spring 20. While the ticketing mechanism is in action, the return-cam 49 moves the return-lever 22 against the action of the overcoming-spring 50 and the pawl 21 on the return-lever 22 drops into the notch 23 on the shunt-bar 18, and after the return-cam 49 has revolved a part of a revolution a notch formed in the cam allows the overcoming-spring to pull back the return-lever, the pawl 21 of which catching against the notch in the shunt-bar 18 carries the shunt-bar with it, shifting the belt onto the driving-pulley and starting the fliers to complete the ball, and at the same time stopping the shunt mechanism. On the completion of the ball a tooth 26 on the trip-cam 24 lifts the pawl out of the shunt-bar and the belt is shifted onto the shunt-pulley, starting the shunt-gear and setting the flier, as before described. At the same time the cutting, ending, doffing, and starting mechanism including the four cams fixed on the shaft 8 is operated. This shaft is regulated by the movement of the return-cam 49 so as to make one revolution for each ball.

The first cam or doffing-plate 51 has a projection for engaging a lever 52 for rocking shaft 53, which by means of a second lever 54, (see Fig. 6,) engaging with a pin 72 on the side of the doffer-tube 73, which tube slides on the spindle 74, bearing underneath the ball, lifts the doffer-tube and knocks off the ball and returns the doffer to its normal position. (See my British Patent No. 21,174 of 1899.) Immediately the ball is doffed the return-cam allows the overcoming-spring to pull back the return-lever, the pawl of which catching against the notch in the shunt-bar carries the shunt-bar with it, shifting the belt onto the driving-pulley and starting the fliers on a new ball and at the same time stopping the shunt mechanism.

The cam 55 is connected in any suitable manner by a lever 56 to a rocking shaft 57, which by means of a second lever 58 holds the cutting-knife 5 against the strain of a spiral spring 7, as before described, and releases it at the proper time, the spring pushing forward the knife, which slides on the clamping-tube and cuts the thread, which is held in position by the clamp.

Figure 19:
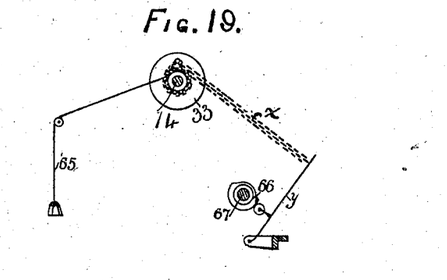
Fig. 19 is a diagrammatic view of the mechanism for controlling the setting of the flier.

The cam 59 is connected in any suitable manner by a lever 60 to a rocking shaft 61, (see Fig. 5,) which by means of a second lever 62 gives motion to a beam 63 through a connecting-rod. In the end of this beam the ending-needle 64 is fixed, and which being operated by the movement of the cam puts the end of the thread into the ball. During the ending of the ball it is necessary for the flier to partially rotate to lay the thread across the front of the ending-needle 64, and this I accomplish by means of the mechanism for setting the flier. The disk 33 of this mechanism is caused to move round a little, and this causes the pawl 34 to engage the ratchet-wheel 32 and move it round until the pawl is again thrown out of action by the cone 36 on the guard 35 in its new position, the amount which the flier $z$ moves being determined by the amount which the pawl 34, attached to the disk 33, moves the ratchet-wheel round. The moving of the disk is done as follows: When the disk 33 is in its normal position, it is stationary and is weighted on one side by a cord and weight 65. (See Figs. 4 and 19.) The cam 66, Figs. 1 and 14, through a lever $y$ and chain $x$, pulls the disk 33 and its pawl 34 round to throw over the flier $z$ to the proper position to place the thread into the clamp 1, while the weighted side 65 brings back the disk 33 to its normal position, as illustrated by Fig. 19.

The cam 68 is connected by a lever 69 to a rocking shaft 70, which by means of a second lever 71 gives motion to the combined hook and clamp for drawing in the thread and holding the free end for starting the next ball.

The operations of ticketing, cutting, ending, doffing, and starting are all performed in proper sequence governed by the adjustments of the disk 43 and cams 51, 55, 59, and 68.

The automatic putting on of the tickets I propose to accomplish by means of a hollow rocking shaft 46, to which is attached a tubular arm $v$, having a perforated disk or ticketing-cup 47 at the outer end. While the first part of the ball is being formed, the ticket is laid onto the ticketing-cup 47 by hand, and kept in place by a fixed horseshoe or like shaped guide $w$, which surrounds about three-fourths of the circumference of the disk. On completion of the first part of the ball the hollow rocking shaft 46 is caused to rock, and at the same time it is opened to an ordinary vacuum-cylinder, which by suction acting through the hollow shaft, the tubular arm $v$, and the perforations in the cup 47 holds the ticket in place while being transferred from the ticket-guide to the ball. Immediately the ticket is in position on the ball the connection of hollow shaft 46 with the vacuum-cylinder is shut and opened to the atmosphere, which frees the ticket from the perforated cup, and the ticketing mechanism is thrown back to its normal position for the next ticket.

Figure 17:
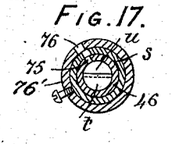
Figs. 17 and 18 are sectional views of the bearing and hollow rocking shaft.
Figure 18:
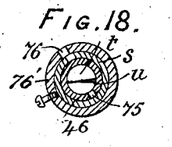

The suction action that holds the ticket in its place while being transferred from the guide-ring to the ball and the admission of the atmosphere to release the ticket from the ticket-cup I accomplish as follows: One of the ends of the hollow rocking shaft 46 is closed and the other end partially closed, and near the latter end an opening 75 is cut in one side, (see Figs. 17 and 18,) which opening communicates with the interior of the hollow shaft, which again communicates with the tubular arm $v$ and the perforated cup 47, on which the ticket is placed by hand. The bearing in which the rocking shaft 46 works is formed as a revoluble liner $s$ and an annular fixed sleeve 76', and the latter is made with an opening 76 at one side, which opening corresponds with an opening in the revoluble tube or rocking shaft 46. The revoluble liner $s$ can be turned to give a lesser or greater degree of cover or opening over the opening 76 in fixed sleeve and consequent volume of air. When the opening 75 in the rocking shaft 46 is closed to the opening 76 in the sleeve, the suction communication between the vacuum-cylinder and the ticket is established, which holds on the ticket while the rocking shaft is being turned in its bearing, as shown in Figs. 17 and 18. The tube 740 makes connection between the hollow interior of the winding-spindle and the vacuum-cylinder through the hole or opening 741.

To close and establish communication between the vacuum-cylinder and hollow shaft 46, the inner end of the bearing is half-closed at $u$, and the end of the hollow shaft is half-closed at $t$, so that when the closed parts correspond with each other communication is established to the vacuum-cylinder, and when the open part of the hollow shaft 46 is opposite the closed part of the bearing communication is closed to the vacuum-cylinder and open to the atmosphere.

The suction air is led from an ordinary vacuum-cylinder by piping 78 (see Fig. 4) and is controlled by means of a cock 79 and ratchet and pawl 80, and the opening and closing of the cock is controlled alternately from the shunt-bar 18 by means of a lever 81 and connecting-rod 82, actuating said ratchet-and-pawl mechanism 80.

Figure 1:
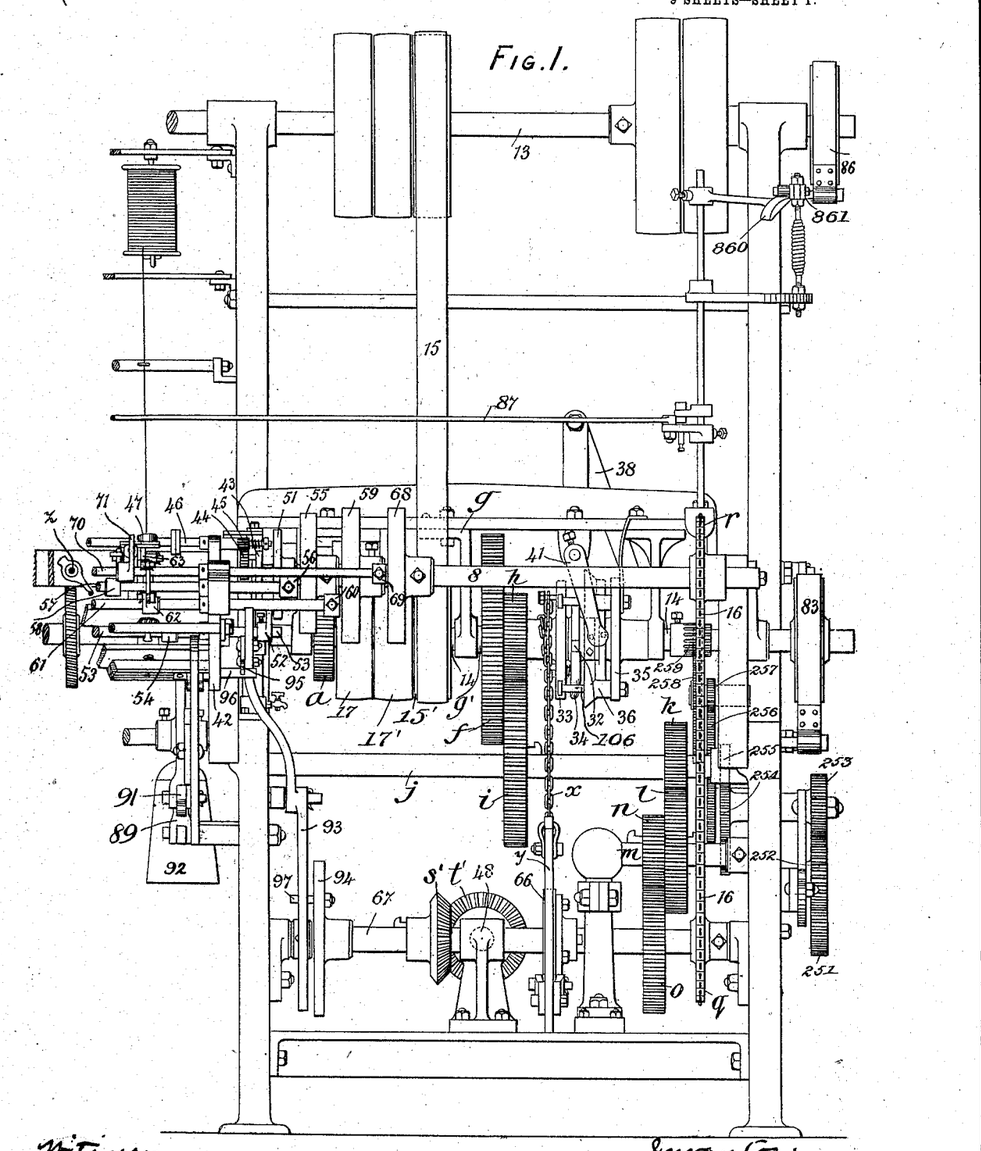
Figure 1 is a partial front elevation of one end.
Figure 1A:
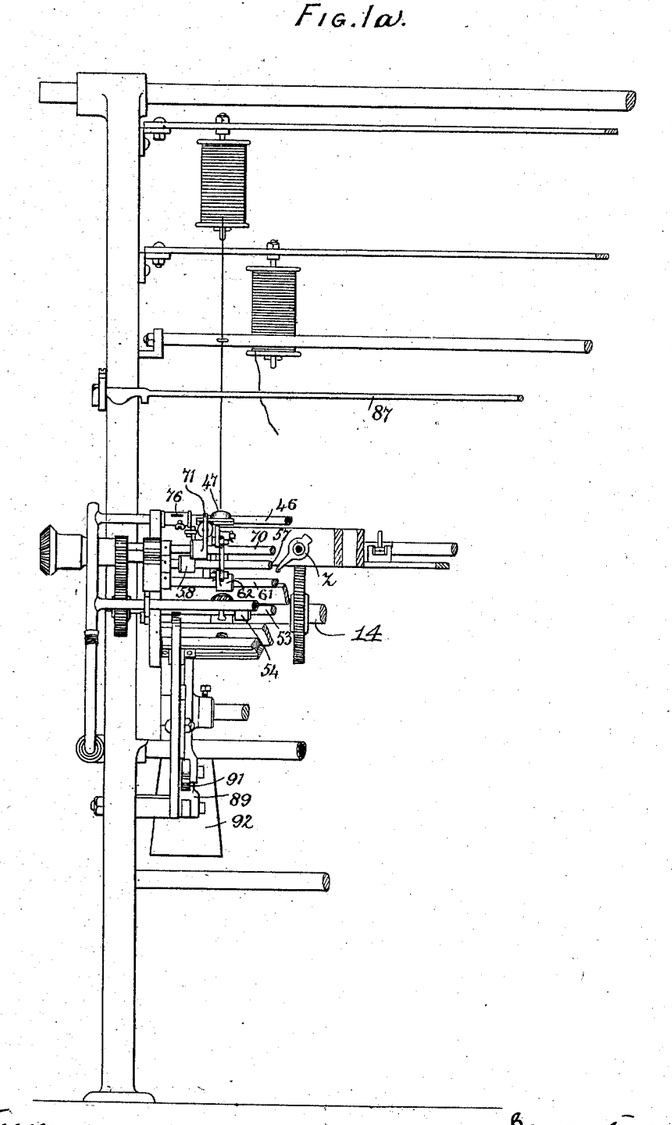
Figure 2:
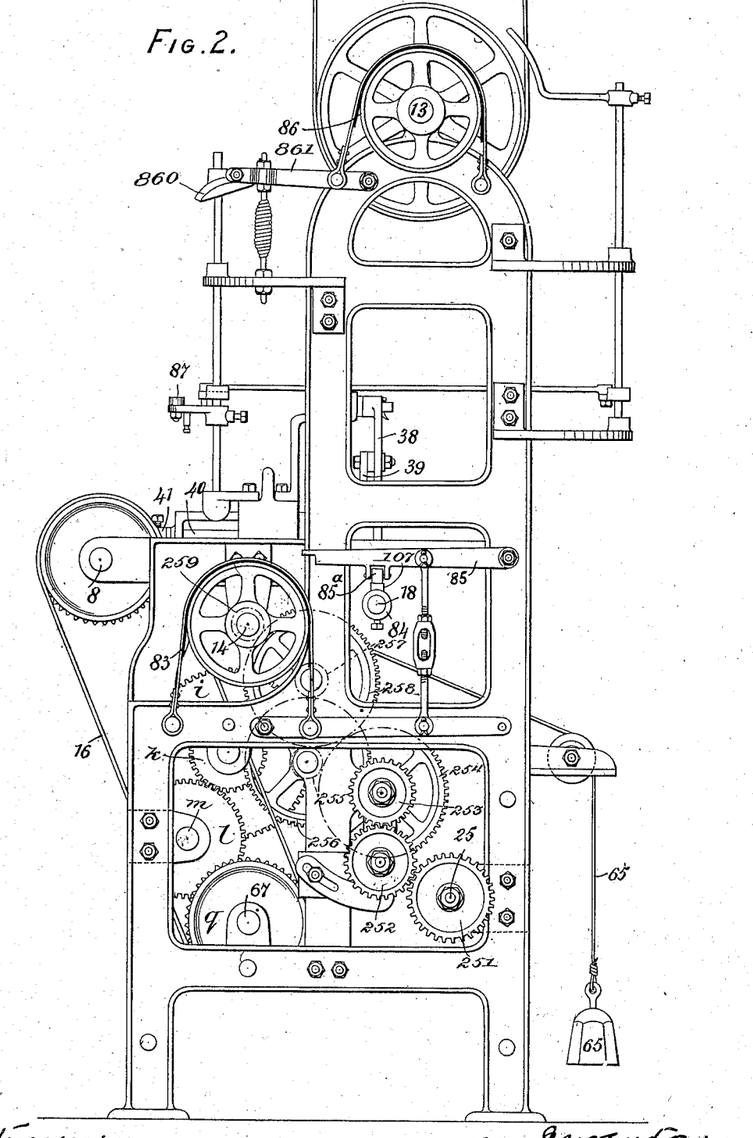
Fig. 2 is a side elevation representing the end of the machine where the automatic mechanism is fitted.
Figure 4:
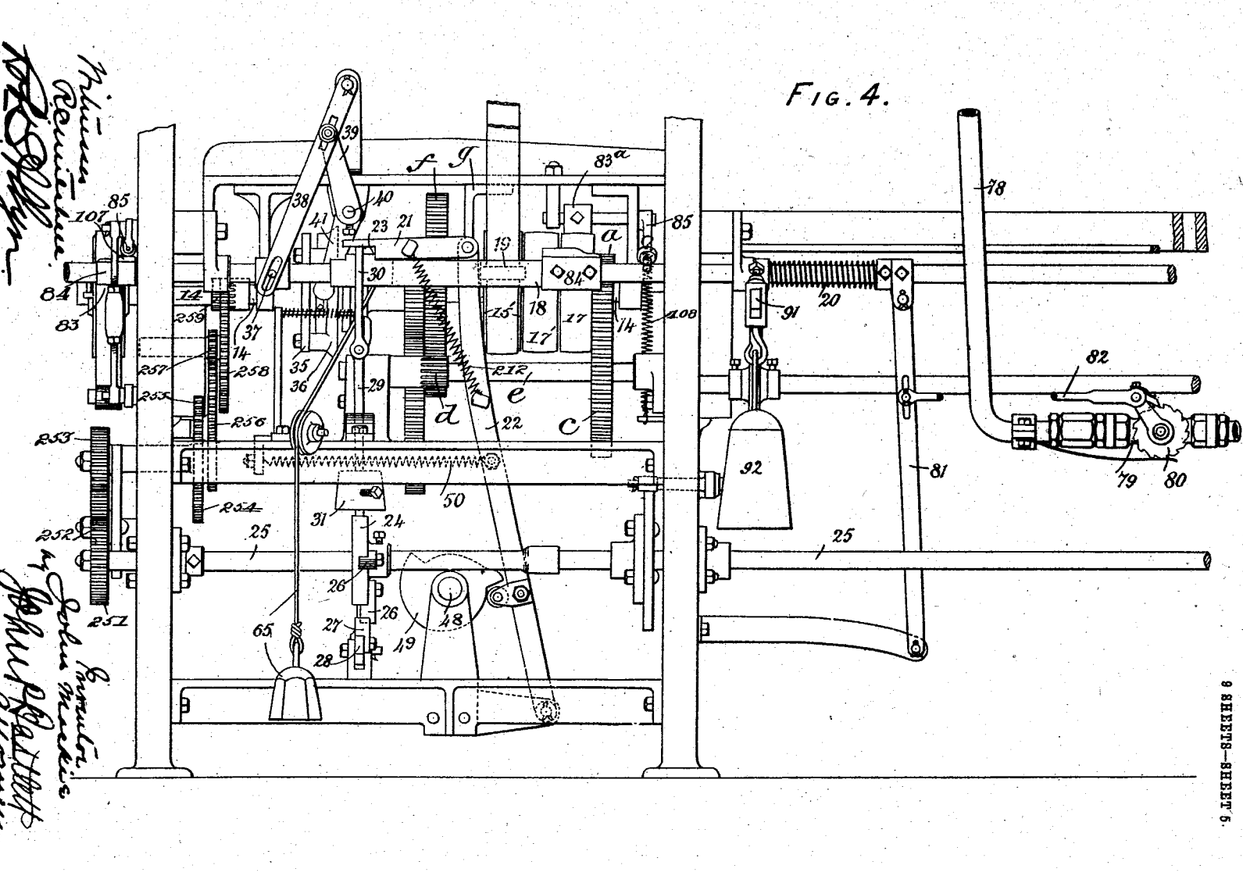
Fig. 4 is an elevation of parts of the rear of the machine.
Figures 5, 7, 7A, 8:
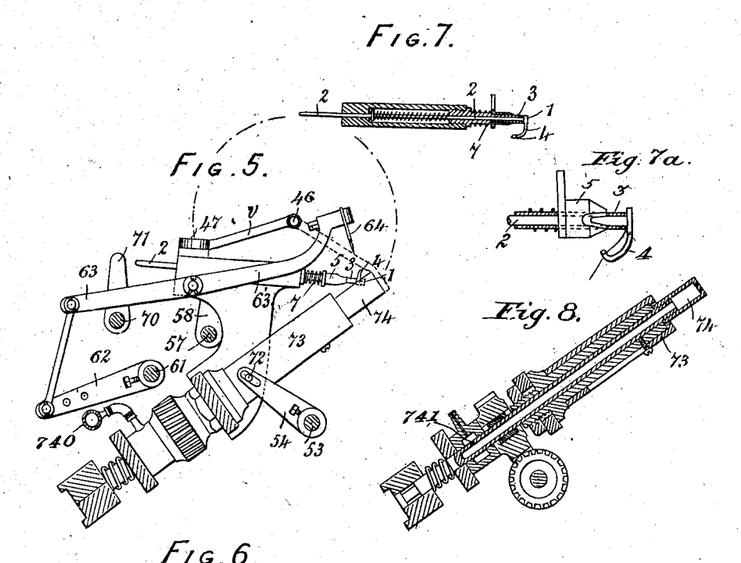
Fig. 5 is a side elevation, partly in section, of the balling-spindle with the mechanism pertaining thereto.
Fig. 7 is a sectional view of the sliding bar for clamping the thread.
Fig. 8 is a sectional elevation of the doffing-spindle.

The brakes 83, Fig. 2, and 83$^a$, Fig. 4, are placed in the two positions, as shown, to slow down the shaft 14 and prevent jarring during changing to the several operations. The brake 83 is a band-brake which is operated by the falling of the lever 85. This lever 85 carries a roller 85$^a$, bearing on a cam 107 or inclined projection carried by the buffer 84. The lever-brake 83$^a$ is operated similarly by means of a spring 108. A brake 86, Figs. 1 and 2, is placed on the shaft 13 to facilitate slowing down when the attendant operates the connecting-rod 87 for stopping the machine. This brake 86 is lifted out of action by the inclined plane 860, acting on the lever 861.

Figure 3:
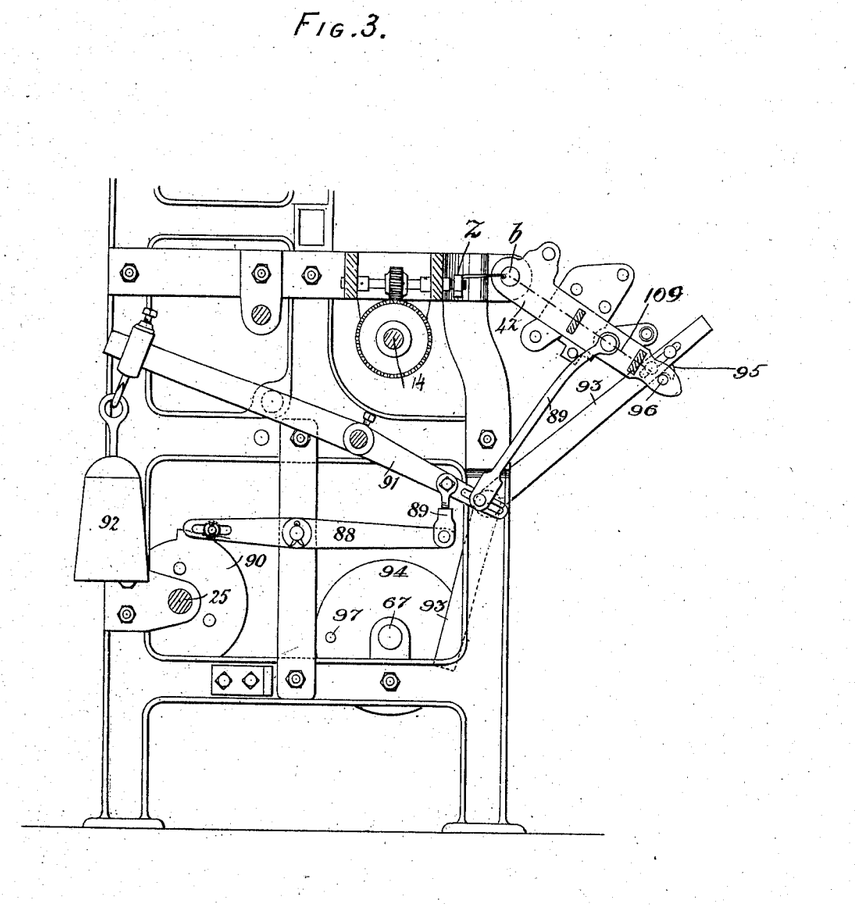
Fig. 3 is a side elevation of the mid-frame of the machine, showing the mechanism for actuating the swinging frame carrying the balling-spindles and the moving parts connected therewith.

The swinging frame 42, carrying the balling-spindles, whose position is indicated in Fig. 3 by the dotted line 109, is operated by a lever 88 (see Fig. 3) and connecting-rods 89 from the cam 90 on the shaft 25, a lever 91 and weight 92 giving the return action. At the stage of finishing the ball a lever 93, (see Fig. 1,) operated by a catch-plate 94, keeps the swinging frame 42 at rest by means of a hook 95 on said lever 93, engaging with a pin 96 on the swinging frame 42, and the hook is released by a pin 97 on the catch-plate 94 to permit the swinging frame 42 to rise to its normal starting position by the action of the weight 92.

The mechanism for winding is operated by one shaft 14, driven from the pulley 15, and the ticketing, ending, and doffing by another shaft 8, driven from the pulley 17, which shafts and their relative mechanism come into operation alternately. The cam 24 is shown in the position for winding to begin, and the belt being on pulley 15 winding proceeds until the first tooth 26 on the cam 24 acts on the lever 28 and by raising the rod 29 30 lifts the pawl 23 and frees the shunt-bar 18, which immediately moves to the right and shifts the belt to pulley 17. This stops the winding-shaft 14 and starts shaft 8 to operate the ticketing mechanism. At the same time the shunt-bar through its levers 38 to 41 moves the hollow cone 36 away from and to disengage it from the pawl 34, which then falls onto the ratchet-wheel 32. This wheel has four teeth, and the disk 33, carrying the pawl, is at the same time pulled around by means of the chain $x$ by the cam 66, operating against the lever $y$. This causes the pawl to catch on the first tooth it comes against and draws the ratchet-wheel around the necessary distance to cause the flier to stand in a certain fixed position. The ticketing mechanism then comes into action, and while the ticketing is being effected the cam 49 is being rotated and forcing the lever 22, carrying the pawl 23, back against the power of the horizontal spring until the highest point is reached, when the lever, being released, is pulled forward by the power of the horizontal spring. The pawl 23 having meantime engaged with the projection on the shunt-bar, the same is pulled to the left to shift the belt onto pulley 15 and start the winding until the ticket is laced on. The movement of the shunt-bar to the left in Fig. 4 causes the hollow cone to move inward and by coming into contact with the tail of the pawl 34 on the disk 33 lifts the pawl out of contact with the ratchet-wheel and allows the winding-shaft to revolve. When the lacing on of the ticket is completed, the second tooth 26 on the trip-cam 24 by its action, as before, once more shifts the belt to pulley 17, when the ending and doffing takes place, and the cam 49 in its rotation again releases the lever and by means of it shifts the shunt-bar and belt to pulley 15, when the cycle of operations again proceeds as follows: Shaft 14 revolves and winding proceeds. Trip-cam 24 comes into operation, shaft 14 stops, shaft 17 revolves, and ticketing takes place while the hollow cone moves away from the pawl and ratchet. Cam 49 comes into operation, and the shunt-bar returns belt to pulley 15 and winding proceeds and the hollow cone moves inward and takes the pawl out of action. Trip-cam 24 again comes into action and shaft 14 is again stopped exactly as before, and ending and doffing is effected by shaft 8, hollow cone 36 again being moved outward to allow pawl to act. Cam 49 then returns the shunt-bar, as before, and the operations are repeated.

Having now described my invention, what I claim as new, and desire to secure by Letters Patent, is—

1. A machine for winding thread, yarn, twine and the like into balls including a flier, means for rotating said flier, ticketing mechanism, means for stopping the flier clear of the ticketing mechanism including a shunting mechanism, means for starting the ticketing mechanism for placing a ticket on the ball, a clamp and means for placing the thread in the clamp where it is to be cut and held for starting the next ball.

2. In machinery for winding thread, yarn, twine and the like into balls, the combination of mechanism comprising a flier, a sliding bar with a tubular guide and a clamp-hook, into which the end of the thread is placed by the partial rotation of said flier and which clamps the thread against the end of said tubular guide through which the bar slides, a tubular movable knife mounted on the guide for cutting the thread and a cam and spring for actuating said knife, substantially as set forth.

3. In machinery for winding thread, yarn, twine and the like into balls, the combination of ticketing, ending, doffing and belt-returning mechanism with a driving-pulley, a shunt-pulley and means whereby the belt is shifted from the driving-pulley to the shunt-pulley, comprising a trip-cam with lever and rod, the shunt-bar and the shunt-spring, said shunt-pulley operating the said ticketing, ending, doffing and belt-returning mechanism, substantially as set forth.

4. In machinery for winding thread, yarn, twine and the like into balls, the combination with a shunt-pulley and a belt therefor, of mechanism for shifting the belt onto the shunt-pulley, a ticketing mechanism and belt-returning mechanism, a flier and mechanism for rotating the flier to a predetermined position, comprising a ratchet-wheel, a disk carrying a pawl engaging said ratchet-wheel, a fixed guard carrying a hollow cone and means for giving said cone a sliding movement, whereby said shunt-pulley brings said pawl into operation, substantially as set forth.

5. In machinery for winding thread, yarn, twine and the like into balls, the combination of a belt with mechanism for shifting the belt, belt-returning mechanism, ticketing mechanism, a flier, mechanism for operating said ticketing mechanism and belt-returning mechanism and mechanism for stopping the flier in a predetermined position comprising a ratchet-wheel, a disk carrying a pawl and operated by the shunt-pulley, a fixed guard carrying a hollow cone, and means for giving said cone a sliding movement substantially as set forth.

6. In machinery for winding thread, yarn, twine and the like into balls, the ticketing mechanism, comprising a pawl mounted on a disk, a single-toothed ratchet-wheel and a quadrant secured to said wheel, a pinion geared into said quadrant, a hollow suction-shaft secured to said pinion, a perforated disk connected to said hollow shaft, a pneumatic cylinder with piston and spring connected to said quadrant and means for regulating the suction action, substantially as set forth.

7. In machinery for winding thread, yarn, twine and the like into balls, the ticketing mechanism comprising a disk, a pawl carried thereby, a ratchet-wheel therefor, a quadrant secured to said ratchet-wheel, a pinion gearing with said quadrant in combination with the trip-cam, shunting mechanism and cams for operating the ending and doffing mechanism, whereby the operation of the shunting mechanism will bring into operation the ticketing, ending and doffing mechanism, substantially as set forth.

8. In machinery for winding thread, yarn, twine and the like into balls, the combination of mechanism for putting the end of the thread into the ball, comprising cam 59, lever 60, rocking shaft 61, lever 62, beam 63 carrying an ending-needle 64 and means for setting the flier, said means comprising a cam, lever and chain and pawl-and-ratchet mechanism, substantially as set forth.

9. A machine of the character described including a flier, means for driving the same, a perforated disk for holding the ticket, mechanism for automatically stopping the flier and operating the perforated disk to place the ticket on the ball, and a valve construction for permitting suction on the ticket when the ticket is being applied and for allowing atmospheric pressure to replace the suction when the ticket is in place, automatic means for starting the flier to lace in the ticket and automatic means for partially rotating the flier and bringing it into position for doffing.

10. In machinery for winding thread, yarn, twine and the like into balls, the means of providing suction action for the ticketing of the balls, comprising the combination of a hollow rocking shaft closed at one end and partially closed at the other, an opening formed in said shaft communicating with a tubular arm carrying a perforated disk on which the ticket is placed, a bearing for the rocking shaft provided with an opening corresponding to the opening in the rocking shaft and having a regulating inside liner and a partially-closed end and means of providing communication with a vacuum-cylinder and with atmosphere respectively, substantially as set forth.

11. In a machine for winding thread, yarn, twine and the like into balls, the combination of a flier, means for driving the flier, means for severing the thread comprising a sliding bar with tubular guide, a clamp-hook into which the end of the thread is adapted to be placed by the flier, the hook being adapted to clamp the thread against the end of the tubular guide, a tubular knife mounted on said guide for cutting the thread, and means for actuating said knife.

12. In a winding-machine, the combination of ticketing, ending and doffing mechanism with a driving-pulley, a shunt-pulley, a belt therefor, means for shifting the belt from the driving-pulley to the shunt-pulley, a driving connection between the shunt-pulley and the ticketing, ending and doffing mechanism, and automatic means for returning the belt to the driving-pulley.

13. In a winding-machine, a flier, two trains of mechanism adapted to drive the flier at different times, ticketing mechanism adapted to be driven by the second train, and means for disconnecting the first train and bringing into action the second train together with the ticketing mechanism.

14. In a winding-machine, a flier, two trains of mechanism for driving the flier at different times, ticketing, ending and doffing mechanism adapted to be brought into operation by the second train and means for disconnecting the first train for stopping the flier and subsequently bringing into operation the second train for starting the flier and the ticketing, ending and doffing mechanism.

15. In a winding-machine, a flier, a main driving-pulley, a shunt-pulley, ticketing and ending mechanism, a driving-train connecting the main driving-pulley to the flier and a second driving-train connecting the shunt-pulley to the ticketing and ending mechanism, a belt, and automatic means for shifting the belt from the main driving-pulley to the shunt-pulley, thus permitting the flier to stop bringing into operation the ticketing and ending mechanism.

16. In a winding-machine, a flier, a main driving-pulley, a shunt-pulley, ticketing and ending mechanism, a driving-train connecting the main driving-pulley to the flier and a second driving-train connecting the shunt-pulley to the ticketing and ending mechanism, a belt, and automatic means for shifting the belt from the main driving-pulley to the shunt-pulley, thus permitting the flier to stop bringing into operation the ticketing and ending mechanism, and automatic means for returning the belt to the main driving-pulley.

In testimony whereof I have signed my name to this specification in the presence of two subscribing witnesses.

JOHN MACKIE.

Witnesses:
JOHN SIME,
R. C. THOMSON.